Jan. 9, 1934.  W. C. ANTHONY ET AL  1,942,402
HYDRAULIC DUMPING BODY
Filed Nov. 21, 1931  2 Sheets-Sheet 1

Inventors
William C. Anthony
Lester Wachter
by Parker + Carter
Attorneys.

Jan. 9, 1934.  W. C. ANTHONY ET AL  1,942,402
HYDRAULIC DUMPING BODY
Filed Nov. 21, 1931   2 Sheets-Sheet 2
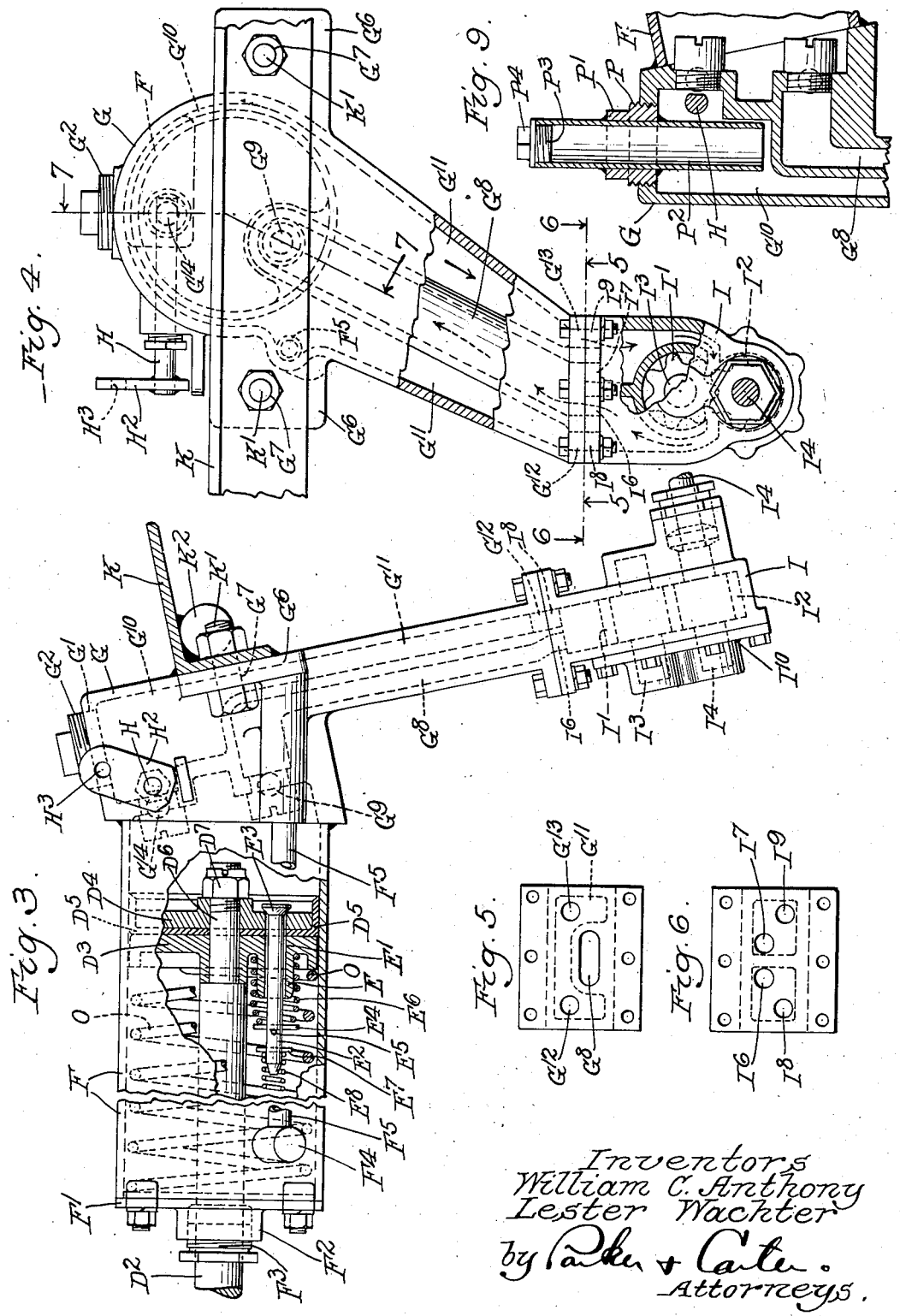
Inventors
William C. Anthony
Lester Wachter
by Parker + Carter
Attorneys.

Patented Jan. 9, 1934

1,942,402

UNITED STATES PATENT OFFICE 1,942,402

HYDRAULIC DUMPING BODY

William C. Anthony and Lester Wachter, Streator, Ill., assignors to The Anthony Company, Streator, Ill., a corporation of Illinois Application November 21, 1931
Serial No. 576,503

3 Claims. (Cl. 298—22)

This invention relates to receptacles and means for tilting them for dumping. It has particular reference to a receptacle mounted on a vehicle, that is to say, to what is generally known as a "dumping body".

It has for one object to provide means for dumping a pivotally mounted receptacle. Another object is to provide a unitary, movably mounted body dumping means. Another object is to provide a hydraulic dumping mechanism in which the hydraulic mechanism itself is formed as a single, unitary assembly, mounted for movement as a whole.

Other objects will appear from time to time in the specification and claims.

The invention is illustrated more or less diagrammatically in the accompanying drawings, wherein:—

Figure 3 is a side elevation of the hydraulic mechanism with parts broken away, and parts in section;

Figure 4 is an end elevation of the hydraulic mechanism with parts broken away and parts in section;

Figure 5 is a transverse horizontal cross section taken at line 5—5 of Figure 4 in the direction of the arrows 5—5.

Figure 6 is a transverse horizontal cross section, taken at line 6—6 of Figure 4, in the direction of the arrows 6—6.

Fig. 9 is a section showing a modified filler plug.

Like parts are designated by like characters throughout the specification and drawings.

Figure 1:
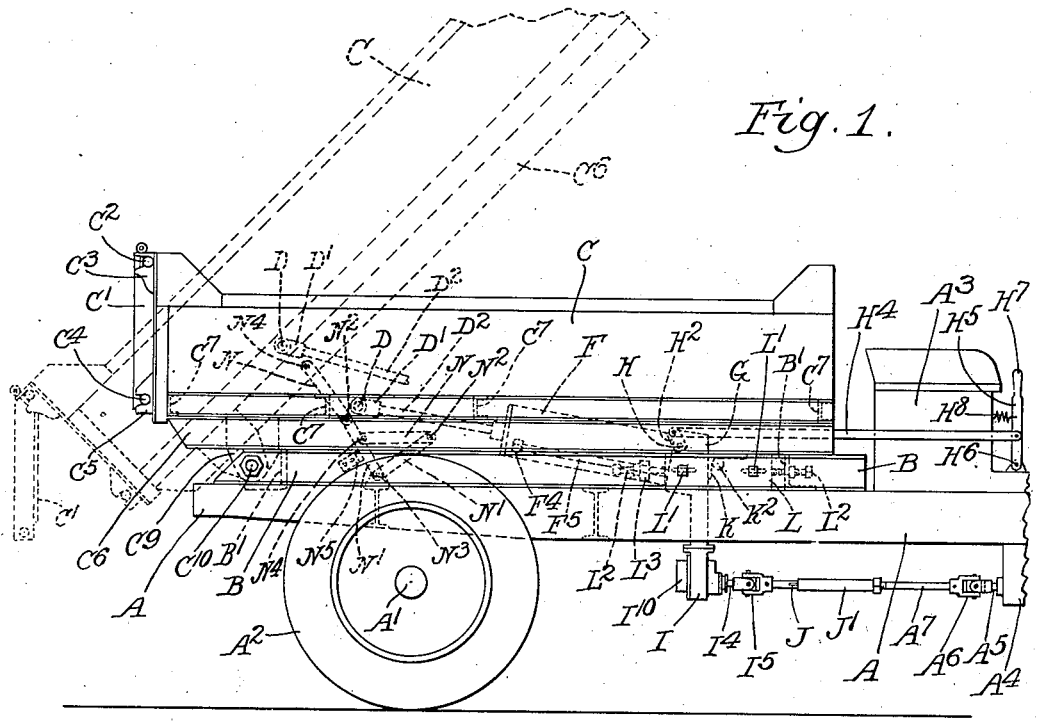
Figure 1 is a side elevation of a dumping body with our tipping mechanism shown.

A is an automobile frame of any suitable type. $A^1$ is an axle upon which wheels $A^2$ are mounted. $A^3$ is a seat for a driver. $A^4$ indicates a power take off from the engine, from which a shaft $A^5$ protrudes. $A^6$ is a universal joint. $A^7$ is a drive shaft. The invention is shown as mounted on an automotive vehicle of any suitable or standard design. The details of the vehicle and its driving mechanism will not be described as they form no particular part of the present invention. It is sufficient that the body and the body dumping mechanism be mounted upon a vehicle having an engine, and that means for connecting the engine to the dumping mechanism be provided so that the latter is actuated by the vehicle engine and thus driven to dump the vehicle.

Mounted upon the automobile frame is a subframe, preferably formed of side members B and having one or more cross members $B^1$ $B^1$.

C is a body or receptacle. It may be open topped and provided at its rear end with a tail gate $C^1$ which may be mounted to swing from above on pins $C^2$ supported in brackets $C^3$ or it may be mounted to swing from below on pins $C^4$ supported in brackets $C^5$. Mounted beneath the receptacle C is a stiffening and strengthening frame construction formed of side members $C^6$ and one or more cross members $C^7$ $C^7$ between two of which are positioned longitudinal members $C^8$ $C^8$. Depending from the receptacle frame adjacent its rear end are a pair of hinge lugs $C^9$ $C^9$ which, by means of pins or bolts $C^{10}$, are mounted for rotation in the side frame members of the sub-frame.

D is a pin or short shaft mounted for rotation in the frame members $C^8$ $C^8$. Positioned on the pin D is a T $D^1$, which is arranged to receive the outer or free end of a piston rod $D^2$. At its inner end the rod carries a pair of plates $D^3$, $D^4$ between which is gripped a cup-like member $D^5$ which may be of leather or other suitable material. The plate $D^4$ is preferably smaller than the plate $D^3$ and the plates and the cup member are mounted on a reduced portion $D^6$ of the piston rod $D^2$ and are held in place by a nut $D^7$ which engages a threaded part of the reduced portion.

The plate $D^3$ is provided with a hollow, preferably cylindrical extension E and is also perforated as at $E^1$ in continuation of the hollow portion of the extension E. The cup $D^5$ and the plate $D^4$ are correspondingly perforated so that a perforation is formed extending clear through the built up piston. A valve stem member $E^2$ having a head $E^3$ is seated in the perforation and in one position closes it. A laterally extending member $E^4$ is fastened to the stem $E^2$, for example by a pin $E^5$. $E^6$ is a compression spring positioned about the stem $E^2$, bearing at one end against the plate $D^3$ and at the other end against the member $D^4$ and tending to hold the stem $E^2$ in such position that the head portion $E^3$ is seated and closes the perforation through the piston. $E^7$ is a lateral extension similar to the extension $E^4$ and it is fastened on the valve stem $E^2$. A spring $E^8$ is mounted on the valve stem, supported by the member $E^7$ and extends outwardly beyond the end of the valve stem $E^2$.

F is a hydraulic cylinder provided at one end with a closing plate $F^1$ which may be removably held in position by any suitable means. It is perforated to permit the piston rod to pass through and about the perforation it is provided with a packing retaining member or cup $F^2$ within which is adjustably seated a packing gland $F^3$. $F^4$ is a connection preferably adjacent the outer end of the cylinder leading from it and positioned beyond the extreme limit of travel of the piston. It communicates with a return pipe $F^5$ which is arranged to conduct fluid back to the pumping assembly, as will be described below.

At the opposite end of the cylinder F there is positioned a housing which may be generally designated by the letter G. This housing has formed within it passages communicating with a pump and serves also to some degree the purpose of a sump. It is generally hollow and is provided with an opening $G^1$ which is threaded and normally closed by a threaded plug $G^2$ which may be perforated as at $G^3$ to provide an opening through the plug. $G^4$ is a ball valve positioned within and normally closing the perforation $G^3$. $G^5$ is a spring tending to hold the valve $G^4$ seated, but permitting yielding of the ball upwardly under sufficient pressure from within so that the valve may open automatically as a result of excessive pressure within the housing. The housing G is provided preferably on opposite sides with lateral extensions $G^6$ $G^6$ which may be provided with perforations $G^7$, as shown particularly in Figure 4. The passages within the housing G are arranged to accommodate themselves to rotation of a gear pump, either clockwise or counterclockwise. A central passage $G^8$ communicates with the interior of the cylinder F and at the point of entrance is provided with a ball check valve $G^9$ which permits fluid to be forced into the cylinder but prevents it from escaping from the cylinder through the passage $G^8$. An irregularly shaped sump-like chamber is formed within the housing G and comprises an upper cavity $G^{10}$ and a communicating passage $G^{11}$, having openings $G^{12}$ and $G^{13}$. It will be understood that both of these openings $G^{12}$ and $G^{13}$ are not in use simultaneously. For a gear pump whose upper member rotates clockwise, as shown in Figure 4, the high pressure supply passage $G^8$ will be used and the return passage $G^{11}$ with the opening $G^{13}$ will be in use. For a gear pump rotated in the opposite direction, the supply pipe $G^8$ and the return passage $G^{11}$ with the opening $G^{12}$ will be used. In either case, one or the other of the openings $G^{12}$ or $G^{13}$ will be plugged. Situated at one end of the cylinder and positioned within the housing G and arranged to control the passage of fluid from the cylinder to the chamber $G^{10}$ is a ball valve $G^{14}$ arranged normally to be held closed by a suitable spring, as shown particularly in Figure 7. The spring normally holds the valve closed and pressure within the cylinder also tends to hold the valve closed.

A shaft H, which is generally round and provided with a flat portion $H^1$ is positioned adjacent the ball valve $G^{14}$. When the parts are in the position shown in Figure 7, the flat portion of the shaft H is opposite the ball and allows it to be seated. When the shaft H is rotated, the curved portion comes against the ball and raises it from its seat, permitting escape from the cylinder. At its outer end the shaft H is provided with a lever $H^2$ which may be perforated as at $H^3$ for attachment to an operating link $H^4$ which may be suitably fastened to a band lever $H^5$. This latter as shown is mounted for movement about a bearing $H^6$. It is provided with a hand portion $H^7$ and a spring $H^8$ tending normally to hold it against accidental movement.

I is a gear pump housing provided with suitable cavities for pumping gears $I^1$ and $I^2$. The gear $I^1$ is positioned on a stub shaft $I^3$ and the gear $I^2$ is mounted on a shaft $I^4$ which may be driven from the power take off shaft $A^7$. A universal joint $I^5$ may be inserted between the two, as shown particularly in Figure 1. The pump housing I is normally provided with four ports, two pressure discharge ports $I^6$ and $I^7$ and two suction or intake ports $I^8$ and $I^9$. The ports $I^6$, $I^7$ communicate with the passage $G^8$ and the ports $I^8$, $I^9$ communicate respectively with the ports $G^{12}$, $G^{13}$ of the passage $G^{11}$. One of the ports $I^6$, $I^7$ and one of the ports $I^8$ $I^9$ will always be plugged or closed. Thus as shown in Figure 4, where the upper rotor of the gear pump rotates clockwise, the ports $I^7$ and $I^8$ are plugged and fluid leaves the pump under pressure through the port $I^6$, moving to the passage $G^8$ and it returns to the pump from the passage $G^{11}$ through the port $I^9$. If the rotation of the pump were reversed the opposite ports would be plugged and thus instead of using $I^6$ and $I^9$, $I^7$ and $I^8$ would be used. A suitable cover plate $I^{10}$ is provided for the pump housing.

To provide for movement of the hydraulic assembly the shaft $A^7$ is made in two sections, one of which carries a key J and the other of which has fastened upon it a tubular member $J^1$ shaped on its interior to receive the key. Thus relative longitudinal movement of the two sections of the shaft $A^6$ is permitted and by reason of the key and tubular construction whatever the relative longitudinal positions of the two parts, they rotate as a unit.

Figure 2:
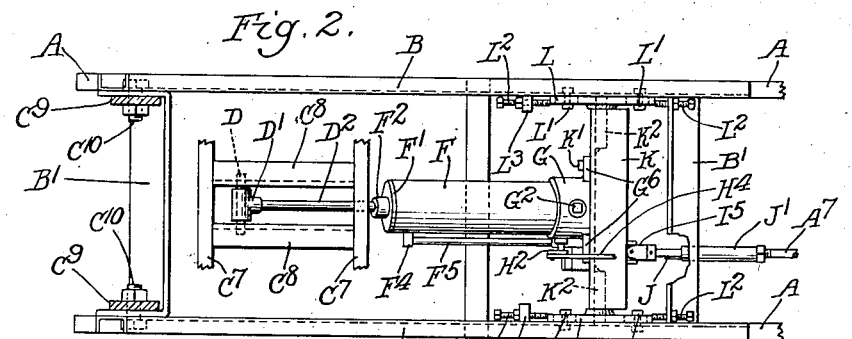
Figure 2 is a plan view of the chassis with parts omitted, parts broken away and parts in section, showing a fragment of the under-framing of the tilting receptacle or body.

To permit a certain oscillating of the hydraulic assembly, the latter is fastened to a member K of angle section. As shown in Figures 2 and 3, the hydraulic assembly, by means of the extensions $G^6$, is bolted to one flange of the angle member K, by means of bolts $K^1$. Pins $K^2$ are fastened, preferably by welding, to the angle member K and serve as trunnions to support it for movement.

On the inside of each of the side frame members B of the sub-frame, is adjustably mounted a trunnion block L. They are perforated to receive the trunnion $K^2$. The trunnion blocks are bolted or otherwise adjustably fastened to the frame members B by means of bolts $L^1$. The blocks themselves are slotted and bearing against each end of each block may be an adjusting set screw $L^2$. Each set screw may be adjustably positioned in a lug $L^3$ which may be welded or otherwise fastened adjacent an end of the trunnion block and preferably upon the side frame member B. Some of the adjusting set screws $L^2$ might be mounted in the flange of the forward cross member $B^1$, as shown particularly to the right of Figure 2. For some purposes only one set screw for each trunnion block is necessary and the other might be omitted. This trunnion and bearing construction permits relative rotational or swinging movement of the entire hydraulic assembly which swings as a unit.

Figure 8:
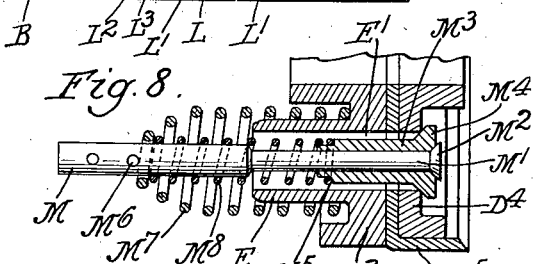
Figure 8 is an enlarged sectional detail showing a modified form of the shaking mechanism.

In Figure 8 there is shown a modified form of the means for causing shaking or vibration of the body. The piston is the same as that shown in the other figures and the plate $D^3$ is provided with the cylindrical extension E and with the perforation $E^1$. The valve is of a modified form, M being the valve stem having a reduced portion $M^1$, terminating in a valve head $M^2$. A second hollow valve stem member $M^3$ is positioned about the reduced portion $M^1$ of the valve stem, and it is provided with a valve head $M^4$. At its end opposite to the head it is reduced as at $M^5$. $M^6$ is a stop formed on the valve stem M. A coil spring $M^7$ is positioned about the valve stem and about the extension E. At one end it bears against the stop $M^6$ and at the other against the plate $D^3$. A smaller spring $M^8$ is positioned about the valve stem M and bears at one end either against the stop $M^6$ or against a portion of the spring $M^7$ and bears at its other end against the tubular valve stem $M^3$, preferably fitting into the reduced portion $M^5$.

As shown in Figure 1 a means is provided to limit the outward or tipping movement of the body. This serves as a positive means to prevent the body over-running during tipping. The stop comprises two link members N and $N^1$, pivoted together at $N^2$. The member $N^1$ is at its opposite end pivoted on the frame B at $N^3$ and the member N is pivoted at $N^4$ on the body frame member $C^6$. A stop $N^5$, preferably mounted on the frame member B, limits movement of the links so that they cannot move far enough in the "straightening" direction to become locked or to interfere in any way with the return movement of the body and this link construction thus can serve only as a means of preventing over-running of the body.

In Figure 3 a different form of construction from that shown in Figure 1 is shown to limit the movement of the body in the dumping direction. As there shown, this limiting means is positioned within the cylinder F and takes the form of a relatively large spring O, which lies within the cylinder F and is preferably held in position against the cylinder head $F^1$. As the piston moves for dumping, it contacts the spring O and compresses it. The movement of the piston may be limited either by the strength of the spring or the parts may be so proportioned that the piston movement is not finally arrested until the spring is completely compressed and then it serves as in effect a solid member, bearing at one end on the cylinder head $F^1$ and at the other on some part of the piston. In the particular form shown in Figure 3, the spring O will bear upon the outer edge or flange of the piston member $D^3$, but whatever form the spring takes, it serves to limit the outward movement of the piston and when it is compressed fully the piston, piston rod, cylinder and spring O make in effect a tie which prevents the body from tipping over backward. Many different spring and other arrangements might be inserted within the cylinder to limit the amount of tipping of the body.

It will be realized that whereas we have herewith shown and described a practical operative device, nevertheless many changes might be made in the size, shape, number and disposition of parts, without departing from the spirit of our invention and we wish, therefore, that our showing be taken as in a sense diagrammatic.

In particular the position of the spring O or its equivalent structure might be widely varied. It might be positioned closely about the piston $D^2$ or it might merely be supported within the chamber formed between the piston and the cylinder head $F^1$. For some purposes the jackknife restraining arms N $N^1$ might be omitted and the restraining and limiting accomplished entirely by the spring O or its equivalent, and the parts associated with it. In other words, either the spring restraining means or the jackknife means, or both of them, might be used.

Frequently where dumping bodies are to be used in moving and discharging material which may tend to adhere to the body, or for other reasons may tend to be difficult to dump, it is advisable to make the body slightly tapered from front to rear. In the present device, when this is done, the receptacle C would be somewhat narrower at the front than at the discharge end. This has the advantage that when the body commences to dump the load, if the load moves as a unit, as it frequently does, a very slight movement of the load in the dumping direction tends to free the entire load, or at least a substantial proportion of it, from contact with the body and thus the dumping is made easier. This effect is augmented and increased when the body is provided with the shaking mechanism of the present invention and thus the tapered shape of the body and the fact that the body is provided with means for shaking it in addition to means for raising it to the dumping position, co-operate to produce a more certain and a more rapid dumping effect.

Figure 7:
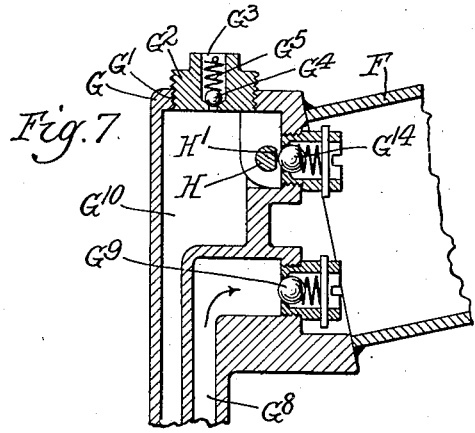
Figure 7 is a generally vertical longitudinal cross section taken at line 7—7 of Figure 4.

In Figure 9 a modified form of filler plug construction is shown, and instead of the ball check valve as shown in Figure 7, a threaded plug P, having an angularly shaped portion $P^1$ is arranged to fit in the opening in the sump housing G. Fastened in the plug and preferably by welding, is a tube $P^2$, which is interiorly threaded at its upper end to receive the threaded portion $P^3$ of a closure plug which is itself squared or otherwise angular in shape as at $P^4$ to receive a tool so that it may be removed or put in place. The pipe $P^2$ might be welded directly to the housing G, so that the only removable part would be the plug $P^3$. The pipe $P^2$ is essentially a permanent part of the sump housing in that case.

The use and operation of our device is as follows:

The device of this invention, when it takes the form of a vehicle, is ordinarily used for transporting and dumping material. When it is to be filled, the body is in the position shown in full lines in Figure 1. The tail gate is closed and the body may then be filled.

Usually the vehicle as a whole is driven to some place where it is desired to dump its load. When the load is to be dumped, the vehicle engine is normally in operation so that power is available to drive the shaft $A^7$ from the power take off $A^4$. Any suitable clutch mechanism may be used for starting or stopping rotation of the shaft $A^7$. By means of rotation of this shaft the gear pump is driven and fluid is circulated, being forced from the pump under pressure to the cylinder. This pressure is effective upon the piston and moves it outwardly or to the left from the original position shown in Figures 1 and 3. During this movement pressure within the cylinder holds the ball check valve $G^9$ closed and since the shaft H is in the position shown in Figure 7, the valve $G^{14}$ is also held closed. The latter may be opened at any time by operation of the hand lever $H^5$. When it is opened, fluid passes out of the cylinder and, depending upon the degree of opening, the body will either be held stationary while fluid circulates through the cylinder, or else the body will be lowered. If the hand lever is not operated, the raising movement will continue. The piston is forced gradually farther out of the cylinder and since it is attached to the body, it tilts the body upwardly to the position shown in dotted lines in Figure 1. When the piston approaches the outward limit of its excursion, the valve stem $E^2$, if the spring $E^8$ is omitted, contacts the inner side of the cylinder closing plate $F^1$. The spring $E^6$ is compressed, the valve head $E^3$ is lifted from its seat and the perforation through the piston is opened and fluid thereupon escapes through this perforation in sufficient quantities to prevent further movement of the piston and this construction thus serves as an automatic check for limiting the outward movement of the piston. Fluid which passes beyond the piston either because of the opening of the valve $E^3$ or because of leakage past the piston or in any other manner, leaves the cylinder through the connection $F^4$ which communicates with the return pipe $F^5$ which discharges into the space $G^{10}$ within the housing G, and the fluid passes downwardly along the passage $G^{11}$ through one of the ports $I^8$ or $I^9$ to the pump and is recirculated. There is thus provided an automatic check to limit the outward excursion of the piston and in addition there is provided a manual control so that the movement of the piston may be controlled to cause any desired length of excursion. The parts may be so proportioned that with either the valve $G^{14}$ or the valve $E^3$ open, the body will stand still in a raised or partially raised position, or they may be so proportioned that once either of them is open the body will tend to return from the tipped position to the untipped position. For some purposes it is desirable to stop the circulation of fluid when the body is tipped or when it is to be returned from the tipped position. When that is the case, the clutch controlling the power take off is operated so that the shaft $A^7$ is no longer rotated and the pump is stopped.

Ordinarily, of course, when the body is to be lowered, the valve $G^{14}$ is opened by manipulation of the lever and then, whether or not the pump continues to operate, the discharge of fluid through the valve $G^{14}$ is sufficient to reduce the pressure within the cylinder to such a degree that the body moves to the lowered position.

For some purposes it is desirable to provide means for shaking or vibrating the body in the tipped position, to shake or jar loose the load. For this purpose the spring $E^8$ shown in Figure 3 may be used. When that is done, as the piston moves to the left from the position shown in Figure 3, the spring $E^8$ first contacts the inner face of the plate $F^1$ and is compressed, but it is not sufficiently stiff to force the valve $E^3$ open against the pressure within the cylinder. As the outward movement of the piston continues, the end of the stem $E^2$ contacts the plate $F^1$ and the valve is forcibly lifted from its seat and escape of fluid through the perforation $E^1$ takes place. This reduces pressure within the cylinder and causes the piston to recede, lowering the body slightly. As soon as the valve is cracked open, pressures are equalized and the spring $E^8$ in effect snaps the valve wider open. As soon as the piston has receded sufficiently to take the valve stem and the spring $E^8$ out of contact with the plate $F^1$, the spring $E^6$ closes the valve, pressure within the cylinder builds up and the piston moves outwardly, raising the body again. Thus so long as the valves $G^9$ and $G^{14}$ remain closed and so long as fluid is supplied under pressure to the cylinder, the piston will move back and forth automatically within narrow limits adjacent the outer end of its excursion, and thus giving to the body a series of jolts or vibrations which tend to jar the load out of the body.

The modified form of vibrating mechanism shown in Figure 8 operates as follows: As the piston moves outwardly under the influence of pressure within the cylinder, the stem M strikes the inner face of the plate $F^1$. As this movement continues the valve stem carrying the valve head $M^2$ moves inwardly with relation to the piston, compressing the spring $M^8$. The pressure within the cylinder, however, holds the tubular valve stem $M^3$ in place, thus keeping the head $M^4$ seated and preventing the escape of fluid. This movement continues without escape of fluid, either until the spring $M^8$ is compressed to its limit or until the larger portion of the stem M contacts the end of the tubular stem $M^3$. When either of these actions occurs, further movement of the piston moves the tubular stem $M^3$ with relation to the piston and raises the valve head $M^4$ from its seat. The moment this is done, fluid is discharged through the piston and pressures are equalized. Then the spring $M^8$ is strong enough to force the tubular valve stem $M^3$ to the outer end of the stem $M^1$ so that the head $M^4$ again contacts the head $M^2$. The valve is wide open then and permits free discharge of fluid. This will cause the piston to recede and as soon as it has moved sufficiently to bring the valve stem M out of contact with the plate $F^1$ the spring $M^7$ will move the composite valve stem backward to seat the valve and this opening and closing of the valve will continue to occur automatically so long as the valves $G^9$ and $G^{14}$ remain closed and the fluid is supplied under pressure from the pump. Sometimes where the body is arranged to move to a very steep angle of dump, the center of gravity of the body and load may be almost over the center of the support or may even be to the rear or to the left of it as shown in Figure 1. In that case there is either no tendency of the body itself to return from the dumped position, or there is only a very slight tendency. When that occurs, the returning movement of the body is automatically initiated by the spring O or its equivalent, which, being under compression when the body is at or near the extreme dumped position, tends to expand and thus to return the body or to initiate returning of the body from the dumped position and when this action occurs, the spring O thus co-operates to achieve the vibrating or shaking effect.

The device will ordinarily be refilled with oil or other fluid when the body is in the raised position and at a time, therefore, when the rod $D^2$ is largely outside of the cylinder. In ordinary use, with the parts in the raised position, fluid will be put into the system until it is entirely full. Thereafter, when the body is lowered, the piston rod $D^2$ is again brought into the cylinder and its presence in the cylinder thus results in an increased compression of the fluid therein. If no provision were made to compensate for this increased compression, damage might be done to the parts. The ball check construction of Figure 7 is arranged so that when the pressure within the system rises above a predetermined point, the spring $G^5$ yields, permitting the ball $G^4$ to rise from its seat and thus permitting overflow to relieve the excessive pressure. The construction shown in Figure 9 may be used instead of that shown in Figure 7. Here preferably the system is filled by removing the plug P³ and pouring fluid through the pipe P². Because the pipe projects down into the sump a considerable distance, air will be caught above the bottom of the pipe P² and thus when fluid is introduced through the pipe into the sump, no appreciable amount of filling will occur above the bottom of the pipe P² and therefore a certain amount of air is entrapped within the system about the lower end of the pipe P² and the system cannot wholly be filled. Thereafter when the body is lowered and the piston rod again moved into the cylinder, the resulting compression is effective to compress the air and does not result in excessive pressures within the system. Either of the devices shown in Fig. 7 or 9 or a combination of them may be used.

We claim:

1. In combination, a dumping body, a support therefor, the body arranged on the support for movement with respect thereto, and a dumping unit, a support to which the dumping unit is fixed, said last mentioned support movably mounted and provided with individually adjustable bearings, and means on said dumping body for driving said dumping unit, including a telescopically arranged driven shaft.

2. In combination, a dumping body, a support therefor, the body arranged on the support for movement with respect thereto, and a hydraulic dumping unit comprising a pressure cylinder and means for supplying fluid under pressure to said cylinder, a support to which the dumping unit is fixed, said last mentioned support movably mounted and provided with adjustable bearings and means for driving said dumping unit, including a telescopically arranged driven shaft.

3. In combination in a dumping body, a receptacle mounted for tipping, a dumping assembly mounted to cause said receptacle to tip, means for driving said dumping assembly, said dumping assembly including means within the normal tipping mechanism for shaking the body at approximately its dumped position, and including additional means for initiating return movement of the body from the dumped position.

WILLIAM C. ANTHONY.
LESTER WACHTER.